May 10, 1966  E. EITLHUBER  3,250,180
MILLING MACHINE

Filed Feb. 17, 1964  3 Sheets-Sheet 3

United States Patent Office 3,250,180
Patented May 10, 1966

3,250,180
MILLING MACHINE
Erich Eitlhuber, Munich, Germany, assignor to Hans Deckel, Munich, Germany, and Friedrich Wilhelm Deckel, Zug, Switzerland
Filed Feb. 17, 1964, Ser. No. 345,171
Claims priority, application Germany, Feb. 19, 1963, D 40,925
4 Claims. (Cl. 90—16)

This invention relates to a milling machine, and more particularly to a device for temporarily separating the tool from the workpiece during the return travel of the tool or workpiece, so as not to damage the machined surface of the workpiece between successive milling operations.

An object of the invention is the provision of a generally improved and more satisfactory device of this character.

Another object is the provision of a device for separating the workpiece and the tool, which is constructed in an extremely simple, compact, and inexpensive manner.

Still another object is the provision of a device of this character which is so constructed that it assures the precise positioning of the tool and workpiece relative to each other, at the end of the return travel, ready for the next operating stroke or traverse.

A further object is the provision of a device for temporarily separating the tool and the workpiece, so designed that it is coupled directly to the in-feed gearing which serves to produce the in-feed motion of the tool relative to the workpiece or of the workpiece relative to the tool, as the case may be.

These and other desirable objects may be attained in the manner disclosed as an illustrative embodiment of the invention in the following description and in the accompanying drawings forming a part hereof, in which.

Figure 1:
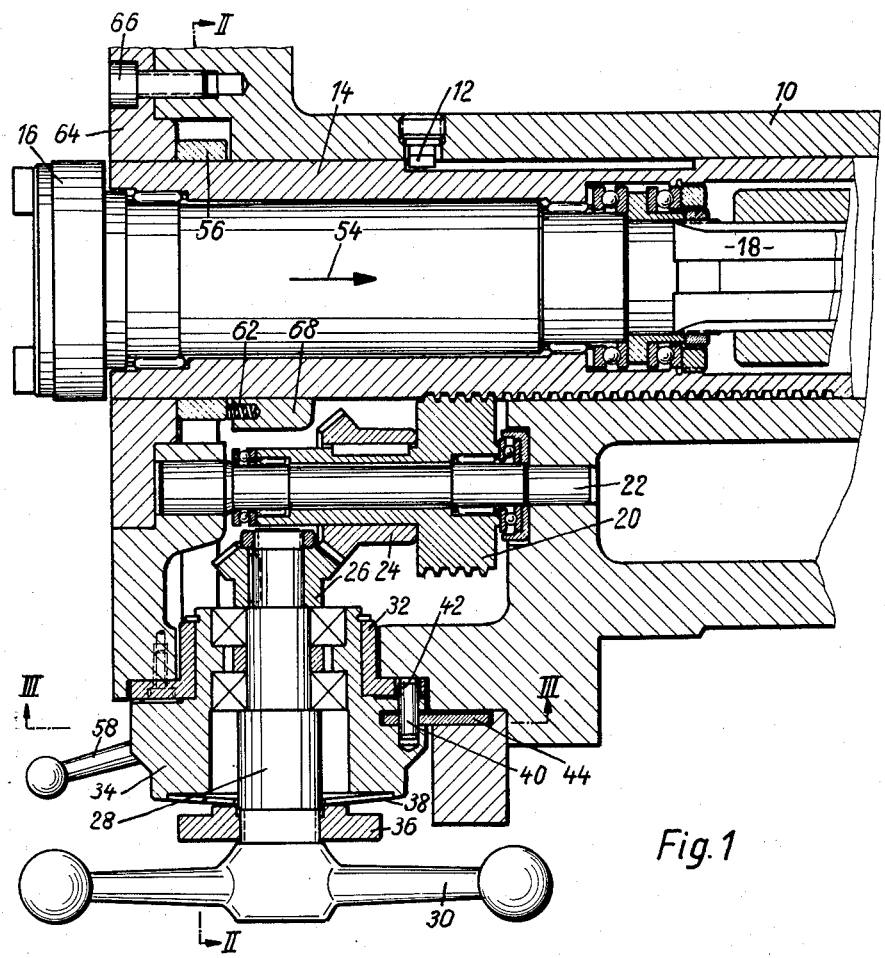
FIG. 1 is a section through a portion of a machine tool, illustrating a device according to a preferred embodiment of the present invention.

The present invention is applicable either to a movement of the tool away from the workpiece, or a movement of the workpiece away from the tool, in either event the movement taking place at the end of one stroke or traverse of the tool relative to the workpiece, to separate the tool and the workpiece slightly from each other during a reverse movement to bring the parts to a new position for the next succeeding stroke or traverse of the tool and the workpiece relative to each other. The slight separation reduces wear on the parts and insures absense of damage to the tool or to the finished surface of the workpiece, during the reverse movement. Accordingly, the mechanism of the present invention may be applied either to a support for the tool, or to a support for the workpiece. In the present embodiment as here illustrated, the mechanism is applied to a machine tool which includes a stationary part 10 (stationary so far as this present invention is concerned, although it may actually be mounted for some movement with which the present invention is not concerned) in which a member or part 14 is longitudinally movable, and the mechanism of the present invention serves to retract this member or part 14 a slight distance at the required intervals, to produce the desired separation of the tool and the workpiece from each other. Thus the part 14 may indicate schematically a column or post or other suitable part which supports a work table, or a part which supports a tool. A longitudinal slot in the part 14 is engaged by a member 12 in the part 10, as clearly seen in FIG. 1, so that the part 14 cannot turn in the part 10, but can move longitudinally. The mechanism of the present invention serves to produce a slight longitudinal movement of the part 14 in the part 10, so as to separate the work and the tool from each other during the return motion after one traverse of the tool across the work has been completed, and in preparation for the next traverse of the tool across the work.

In the preferred form, it is the tool carrier rather than the workpiece which is slightly retracted during the return movement. Thus the movable part 14 may, for example, represent a quill, in which a milling spindle 16 is rotatably supported. The milling spindle carries any suitable milling tool of conventional kind, not shown, and is driven in conventional manner from its end 18 which is provided with longitudinal grooves for connection with drive means of known kind.

The part 14 (whether it be a quill, or whether it be some other suitable part of the machine tool) is provided along one side with teeth, as illustrated. These teeth mesh with a worm 20 rotatably supported on a shaft 22. The worm 20 is driven by means of a bevel gear 24 fixed to the worm 20, meshing with another bevel gear 26 which is on the shaft 28 preferably at right angles to the shaft 22, this shaft 28 having a handwheel 30 or other suitable means to turn it. Rotation of the handwheel 30 thus turns the worm wheel 20 and moves the part 14 longitudinally in one direction or the other, depending upon the direction of rotation of the handwheel. This produces the feeding motion of the part 14 relative to the part 10, which may be called the in-feed, being the feed which positions the workpiece and the tool in proper position relative to each other ready for a stroke or traverse of the tool across the desired part of the workpiece.

Concentrically with the shaft 28, there is a bearing bushing 32 screwed into and held immovably in the part 10 of the machine. At its outer end, this bushing 32 has a marginal flange extending radially outwardly as shown. This radial flange has a circumferential slot 42 as further described below.

Rotatable within the bushing 32, and surrounding the shaft 28, is an annular member or sleeve 34 which can be coupled to the shaft 28 when desired, by means of a pressure nut 36 threaded on the shaft 28, and a cup spring 38 engaging a recess in the outer end of the sleeve 34 as seen in FIG. 1. When the nut 36 is tightened against the cup spring 38, the spring is deformed closer to a plane or flat shape, and grips tightly in the edges of the recess in which it is seated in the sleeve 34, thereby coupling the sleeve 34 and the shaft 28 to each other for rotation together. When the nut 36 is backed off from the cup spring 38, the coupling is rendered ineffective, and the shaft 28 and sleeve 34 can rotate independently of each other.

Figure 3:
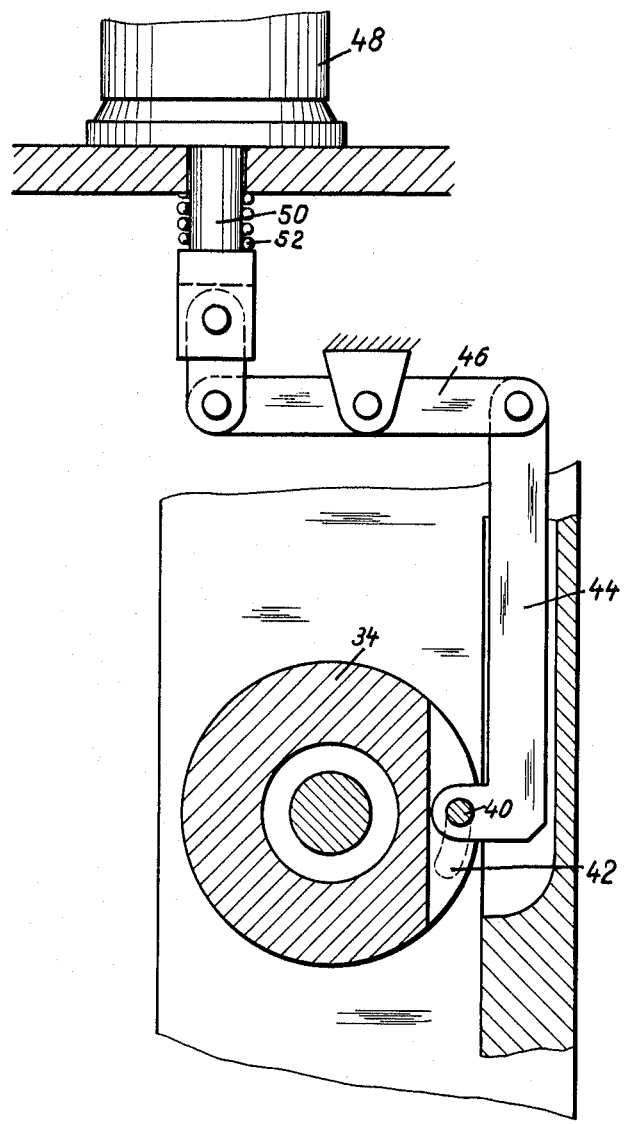
FIG. 3 is a fragmentary section through the construction, taken partially along the line III—III of FIG. 1.

The sleeve 34 carries a bolt 40, the rear end of which engages in the previously mentioned arcuate slot 42 formed in the radial flange of the bushing 32. Thus the ends of the slot 42 form stops or abutments limiting the extent to which the sleeve 34 can rotate. The bolt 40 passes snugly through an opening near one end of the link or tie-rod 44, the other end of which is pivotally connected to one end of a double armed lever 46 as seen in FIG. 3. The other end of the double armed lever is operatively connected, as illustrated, to the armature 50 of an electromagnet 48. The electromagnet and armature may be of conventional design. When electric current is applied to the magnet, it lifts the armature 50 against the force of an associated spring 52, thereby depressing the link 44 and causing a slight clockwise rotation of the sleeve 34 when viewed from the direction of FIG. 3. When the flow of current to the lift magnet is interrupted, the spring 52 depresses the armature, thereby raising the link 44 and turning the sleeve 34 back in a counterclockwise direction.

If the nut 36 has been tightened against the cup spring 38, so as to couple the sleeve 34 to the shaft 28, it will be seen that energization of the lift magnet 48 will turn both the sleeve 34 and the shaft 28 in a clockwise direction to the extent permitted by the length of the slot 42, thereby turning the worm 20 and causing slight longitudinal movement of the part 14 relative to the stationary part 10. This will move the tool slightly away from the workpiece, assuming that the tool is mounted on the tool spindle 16 in the part 14 and assuming that the workpiece remains stationary at this time; or, conversely, it will move the workpiece slightly away from the tool, assuming that the part 14 represents a portion of a support for the work table. In either event, only a slight movement of separation between the tool and the workpiece is needed, in order to free the tool from the workpiece for the return travel of the tool, ready for the next stroke or traverse across the workpiece.

When the current to the lift magnet 48 is turned off, the spring 52 will return the sleeve 34 and shaft 28 to the initial position, thereby operating the worm 20 in the opposite direction and restoring the part 14 to the position which it occupied before the lift magnet 48 was energized. However, to insure that the part 14 is returned exactly to its precise previous position, it is preferred to employ shiftable stop means acting directly on the part 14, which shiftable stop means serves to control the limit position of the part 14 during its return motion when the lift magnet 48 is de-energized.

Figure 2:
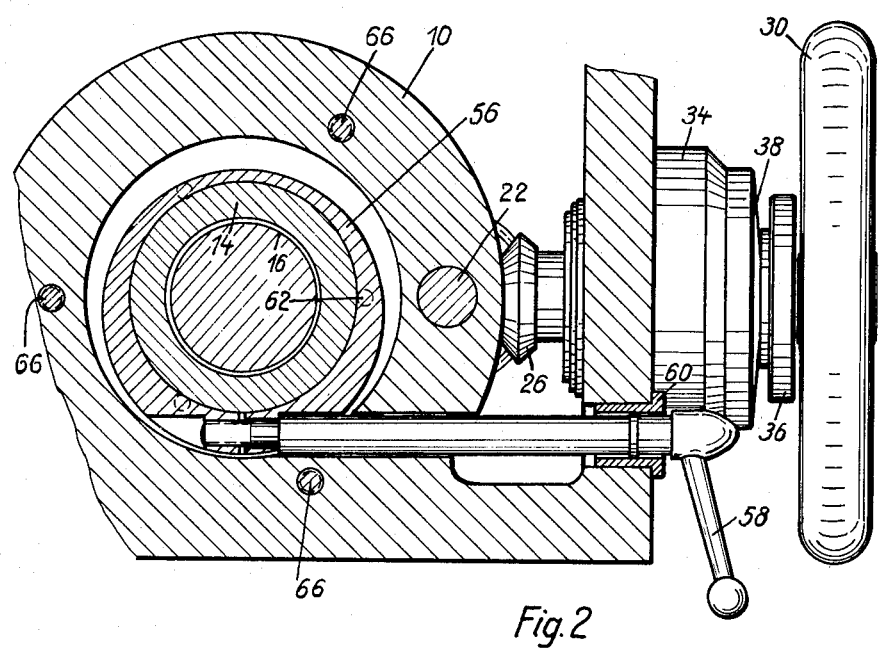
FIG. 2 is a fragmentary section taken approximately along the line II—II of FIG. 1.

For this purpose, there is a clamping ring 56 which surrounds the part 14 and is split at one point as seen in FIG. 2. The two ends of the split clamping ring 56 can be drawn together to cause the ring to clamp tightly on the part 14, by means of a screw threaded bolt 58, the operating end of which is so supported in a bushing 60 that slight angular movement of its axis are possible. Several springs 62, spaced at various points around the circumference of the clamping ring 56, serve to urge the clamping ring in a direction leftwardly when viewed as in FIG. 1, so that whenever it is not clamped fast to the member 14, the springs will hold the left edge of the ring 56 tight against the inner or right hand face of the cover member 64 which is fastened by screws 66 to the socket 10.

Thus when the clamping ring 56 is clamped firmly on the part 14, it forms a stop for the return or restoring motion of the part 14, by coming against the inner face of the cover 64. It will be seen from FIG. 1 that the available space for axial movement of the ring 56 is quite small, but this is sufficient, as it is only necessary for the magnet 48 to separate the tool from the workpiece by a very small distance, in order to accomplish the purposes of the present invention.

It may be mentioned at this point that the thread of the worm 20 is designed as what is called a self-locking thread. In other words, it is at such an angle that the worm 20 cannot be turned by longitudinal forces exerted on the member 14. It is necessary to turn the worm 20 in order to move the part 14 longitudinally.

The operation is as follows: When the parts are initially adjusted for the commencement of the milling operation or other machining operation, the clamping ring 56 is loosened by suitable operation of the handle 58, and the shaft 28 is uncoupled from the sleeve 34 by loosening the nut 36. Then the handwheel 30 is turned in one direction or the other, to turn the worm 20 so as to produce the desired in-feed of the quill 14 (or other machine tool part, if for example the part 14 represents a support for a work table rather than a quill for a tool spindle) until the desired relationship of the tool and the workpiece is achieved, ready for the first stroke or traverse of the tool across the workpiece, or vice versa. The nut 36 is then tightened against the dished spring 38, to cause the shaft 28 to be coupled rigidly to the sleeve 34. The handle 58 is operated to clamp the split ring 56 firmly on the part 14, it being remembered that at this time the ring 56 is engaged tightly with the cover 64, on account of the action of the springs 62.

The milling or other machining operation then proceeds, making the first stroke or traverse of the tool relative to the workpiece. When it is time to cause a return travel of the tool (or of the workpiece, if it is the workpiece which is moved rather than the tool) ready for the next operating stroke or traverse, the lift magnet 48 is energized, by closing an appropriate circuit switch either manually or automatically, as the case may be. The energization of the lift magnet 48 slightly turns the sleeve 34 in the manner already described, and since at this time the shaft 28 is coupled to the sleeve 34 through the coupling mechanism 36, 38, the shaft 28 is also turned slightly, thereby slightly turning the worm 20 in a direction to retract the quill or other part 14 a slight distance in the direction of the arrow 54. When the return movement of the tool relative to the work is completed, current to the magnet 48 is cut off and the spring 52 turns the parts 34, 28, and 20 in the reverse direction, thereby restoring the quill or other part 14 in a leftward direction when viewed as in FIG. 1, to the precise position determined by engagement of the previously set clamping ring 56 against the stationary cover plate 64. The parts are so designed and proportioned that the limit of restoring movement of the part 14 is determined by the clamping ring 56, rather than by the end of the arcuate slot 42 in the bushing 32. In this way, after the lifting of the tool from the work for the return movement, it is always restored precisely to its previous position ready for the next operating movement or traverse. Of course the tool and the workpiece are moved relative to each other, in a direction perpendicular to the movement of the part 14, ready for the next operating traverse, so that the tool will engage with a different part of the workpiece, but this is a conventional feeding movement with which the present invention is not concerned. The present invention deals only with the slight retraction or separation of the tool and the workpiece from each other, during the return movement ready for the next operating stroke or movement.

It is to be noted that this lifting of the tool from the work is accomplished very simply, by using the same mechanism (parts 20 to 30, inclusive) which is used for the normal in-feed movement of the part 14 when normally positioning the tool in proper relationship to the work at the beginning of the milling operation. Thus it is not necessary to provide a separate drive train or feeding train for lifting the tool from the work during the return movement, as is necessary with some constructions previously suggested.

It is seen from the foregoing disclosure that the objects and purposes of the invention are well fulfilled. It is to be understood that the foregoing disclosure is given by way of illustrative example only, rather than by way of limitation, and that without departing from the invention, the details may be varied within the scope of the appended claims.

What is claimed is:

1. In a milling machine, the combination of a machine part movable longitudinally in a forward direction to bring a tool and a workpiece into cooperative relation to each other and movable in a reverse direction to separate the tool and the workpiece from each other, normal feeding mechanism for feeding said machine part in either direction at will, said feeding mechanism including a rotary member normally capable of rotation through at least one complete revolution to cause substantial longitudinal movement of said machine part, a supplementary drive operatively connectable to and disconnectable from said rotary member, means for operating said supplementary drive, while operatively connected to said rotary member, to turn said rotary member through only a fraction of a revolution in a first direction to move said machine part a slight distance in its said reverse direction to cause separation of the tool and the workpiece, and through only a fraction of a revolution in a second direction to move said machine part a slight distance in its said forward direction, adjustable stop means for limiting the extent of said movement of said machine part in its said forward direction as a result of operation of said supplementary drive, and releasable coupling means for coupling said sleeve and said rotary member for conjoint rotation, said supplementary drive including a sleeve surrounding and rotatable concentrically with said rotary member of said normal feeding mechanism, said means for operating said supplementary drive including electric power means for turning said sleeve in said first direction to separate the tool from the workpiece and spring power means for turning said sleeve in said second direction to cause slight feeding of said machine part in a forward direction to an extent permitted by said adjustable stop means.

2. A construction as defined in claim 1, in which said machine part is in the form of a quill containing a rotary milling spindle.

3. A construction as defined in claim 2, in which said adjustable stop means is in the form of a releasable clamping ring surrounding said quill and adapted to engage a fixed part to limit movement of said quill in a forward direction.

4. A construction as defined in claim 3, further including springs acting upon said clamping ring in a direction to keep said clamping ring engaged with said fixed part so long as said clamping ring is not clamped to said quill.

References Cited by the Examiner

UNITED STATES PATENTS

| 2,445,433 | 6/1948 | Holstrom | 90—16 |
| 2,615,372 | 10/1952 | Coffin | 90—16 |
| 2,933,986 | 4/1960 | Schroeder | 90—16 |

FOREIGN PATENTS 147,876  3/1962  Russia.

WILLIAM W. DYER, JR., *Primary Examiner.*

L. VLACHOS, *Assistant Examiner.*